United States Patent
Daly et al.

(10) Patent No.: US 12,415,403 B2
(45) Date of Patent: Sep. 16, 2025

(54) DUAL FLAP PRESSURE RELIEF VALVE

(71) Applicant: Illinois Tool Works Inc., Glenview, IL (US)

(72) Inventors: Erin M. Daly, Ontario (CA); Michael R. Markie, Roseville, MI (US); Ganesh P. Chebrolu, Farmington Hills, MI (US)

(73) Assignee: Illinois Tool Works Inc., Glenview, IL (US)

( * ) Notice: Subject to any disclaimer, the term of this patent is extended or adjusted under 35 U.S.C. 154(b) by 490 days.

(21) Appl. No.: 17/948,370

(22) Filed: Sep. 20, 2022

(65) Prior Publication Data

US 2023/0118518 A1  Apr. 20, 2023

Related U.S. Application Data

(60) Provisional application No. 63/256,758, filed on Oct. 18, 2021.

(51) Int. Cl.
*B60H 1/24* (2006.01)

(52) U.S. Cl.
CPC .................................. *B60H 1/249* (2013.01)

(58) Field of Classification Search
CPC ......... F16K 15/035; B60H 1/249; F24F 13/15
USPC ............................................................ 454/70
See application file for complete search history.

(56) References Cited

U.S. PATENT DOCUMENTS

| | | | |
|---|---|---|---|
| 5,194,038 A | 3/1993 | Klomhaus | |
| 5,263,895 A | 11/1993 | Kraus | |
| 5,601,117 A | 2/1997 | Lewis | |
| 5,904,618 A | 5/1999 | Lewis | |
| 6,132,308 A | 10/2000 | Dietz | |
| 6,837,784 B2 | 1/2005 | Omiya | |
| 7,044,164 B2 * | 5/2006 | Carlson | F16K 17/0453 454/162 |
| 7,137,880 B2 | 11/2006 | Omiya | |
| 8,328,609 B2 | 12/2012 | Schneider | |
| 8,419,513 B2 | 4/2013 | Weber | |
| 8,955,542 B2 | 2/2015 | Kiezulas | |
| 8,986,086 B2 | 3/2015 | Carlson | |
| 10,391,838 B2 * | 8/2019 | Schwarzkopf | B60H 1/249 |
| 2009/0068940 A1 | 3/2009 | Bloemeling | |
| 2009/0075580 A1 | 3/2009 | Mootz | |
| 2010/0120346 A1 | 5/2010 | Jansen | |
| 2015/0165873 A1 * | 6/2015 | Schwarzkopf | F16K 15/031 454/70 |

\* cited by examiner

*Primary Examiner* — Ko-Wei Lin
(74) *Attorney, Agent, or Firm* — McAndrews, Held & Malloy, Ltd.

(57) ABSTRACT

A pressure vent valve for ventilation of the interior of a motor vehicle, with a frame with at least one sealing surface and with at least one flexible valve flap mounted on the frame. In an idle position, the valve flap assembly abuts the sealing surface to prevent a flow of air through the pressure vent valve. When a sufficient pressure occurs, the valve flap assembly assumes an open position lifted from the sealing surface to allow a flow of air through the pressure vent valve. The valve flap assembly comprises a first flap sheet stacked upon a second flap sheet.

20 Claims, 9 Drawing Sheets

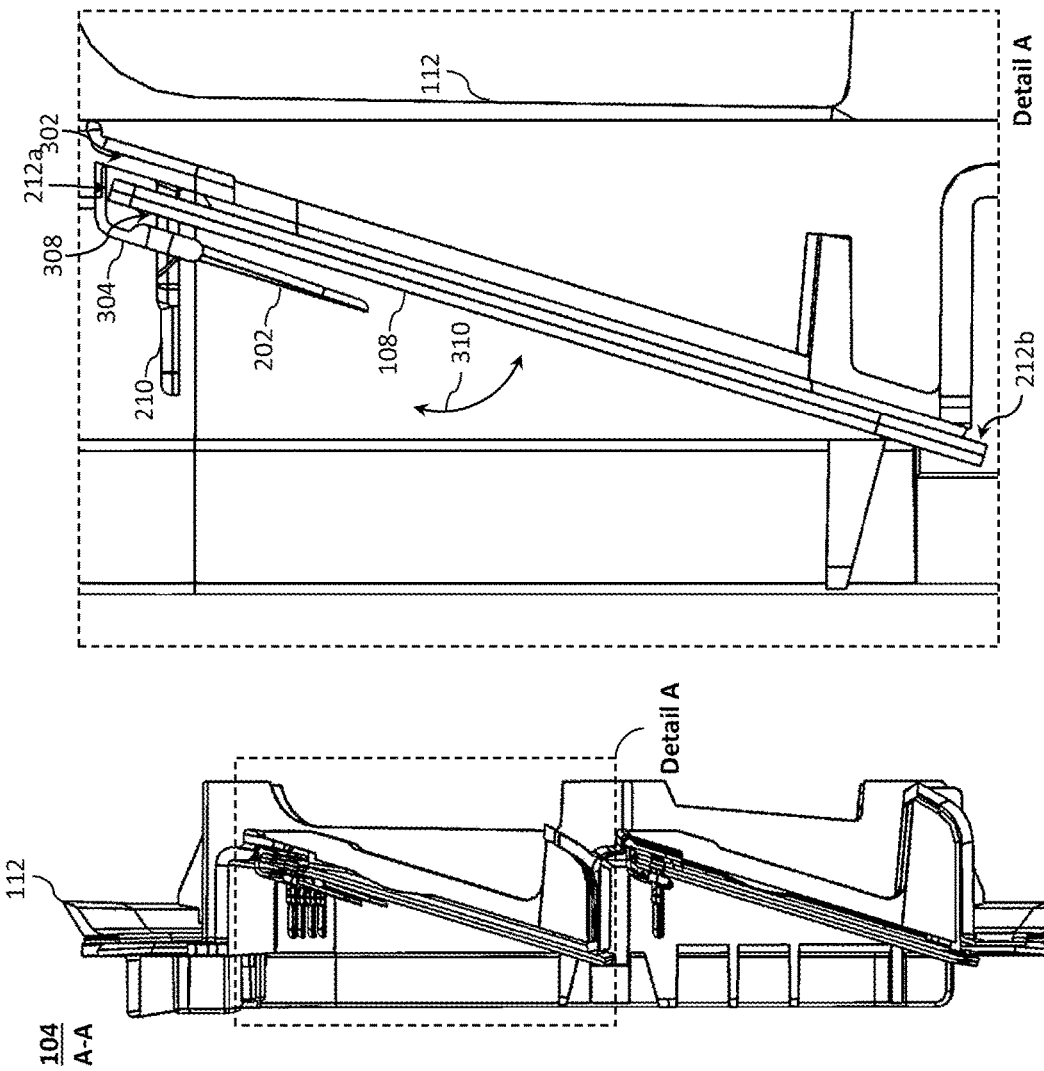

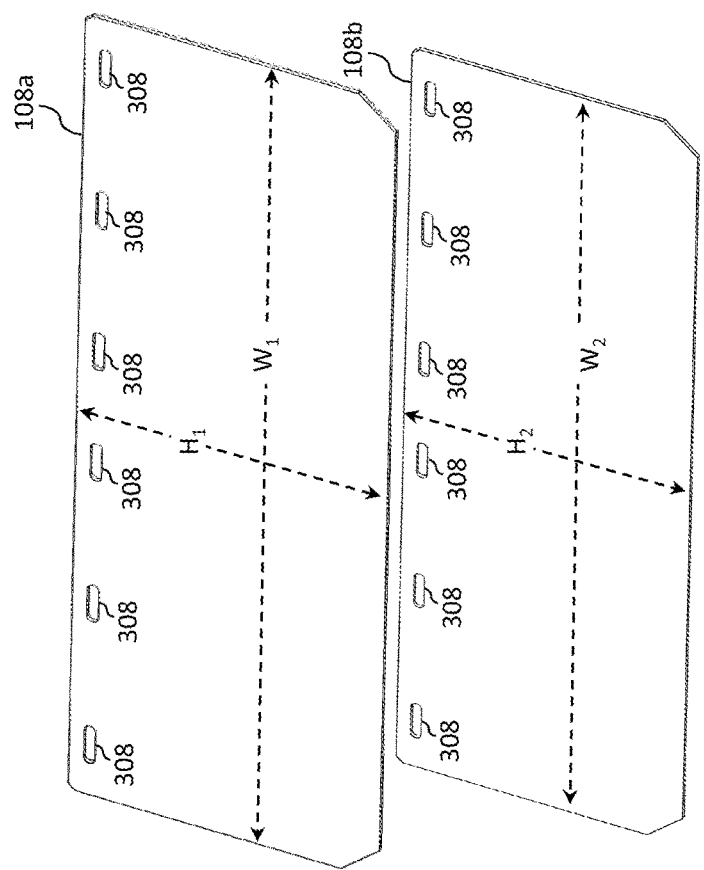
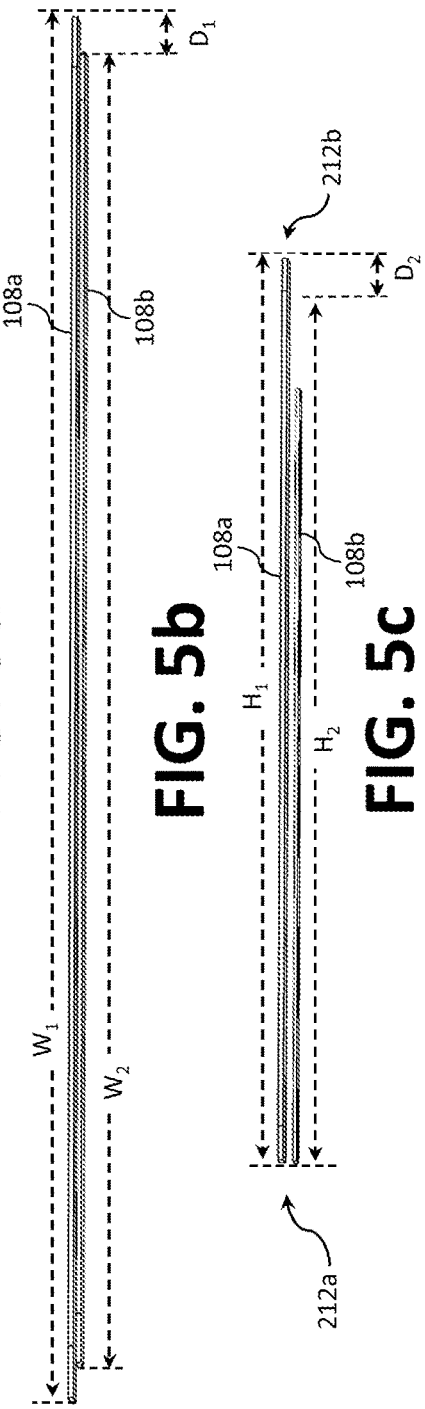
FIG. 5a
FIG. 5b
FIG. 5c

DUAL FLAP PRESSURE RELIEF VALVE

CROSS-REFERENCE

The present application claims the benefit under 35 U.S.C. § 119(e) of U.S. Provisional Patent Application Ser. No. 63/256,758, which was filed on Oct. 18, 2021 and is entitled "Dual Flap PRV." The contents of which are hereby incorporated by reference.

BACKGROUND

The disclosure relates to a return air blocking device for ventilation of the interior of a vehicle, such as a motor vehicle. Such return air blocking devices are fitted in openings in the body of a vehicle. In operation, if a positive pressure predominates in the interior of the vehicle relative to the environment of the vehicle, the valve flaps of the return air blocking device open to allow air to flow out of the vehicle interior and reduce the positive pressure. In the opposite flow direction, the valve flaps block the openings. Example return air blocking devices to ventilate the interior of vehicles are described in commonly owned U.S. Pat. No. 8,328,609 to Daniel Schneider and U.S. Pat. No. 10,391,838 to Nikolaus Schwarzkopf and Marco Spanier.

Existing return air blocking devices, however, often employ flaps or flap assemblies that can become warped or damaged over time due to dust and moisture cycling, thus resulting in a poor seal. Therefore, it would be desirable to provide a return air blocking device with flap assemblies that mitigate the effects of such warping or damage to maintain a seal over time.

SUMMARY

The present disclosure relates generally to a return air blocking device with flaps that offer increased resistance to warping or damage, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

Figure 2A:
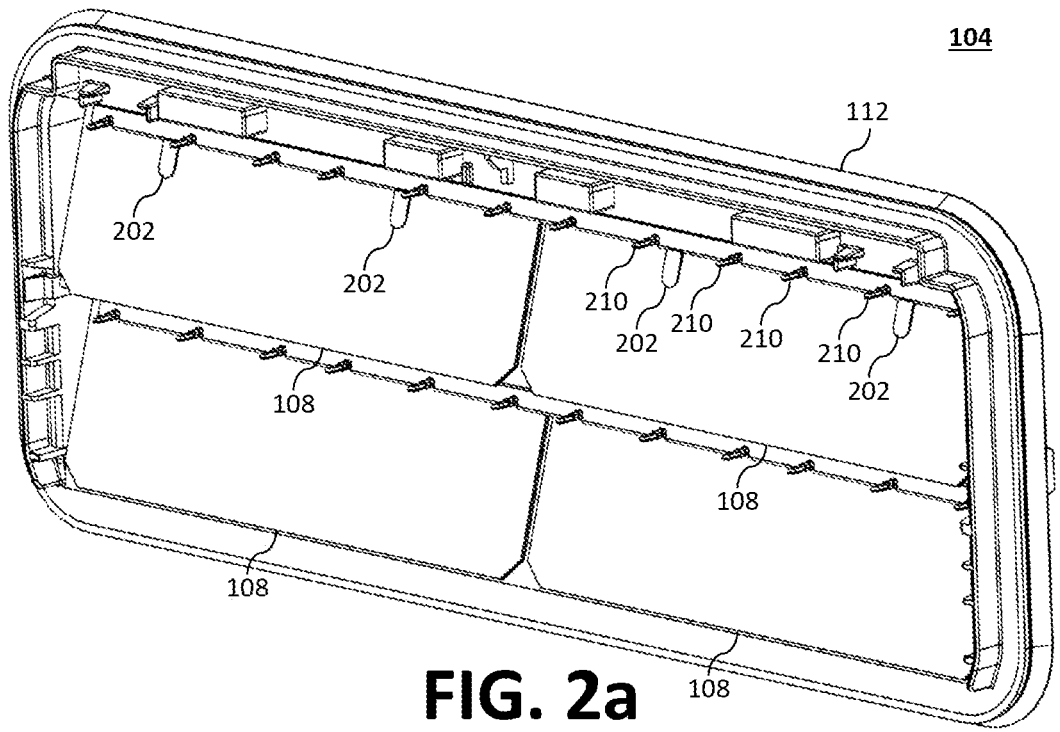
FIGS. 2a and 2b illustrate, respectively, front and rear perspective views of an example pressure vent valve in accordance with an aspect of the subject disclosure.
Figure 2B:
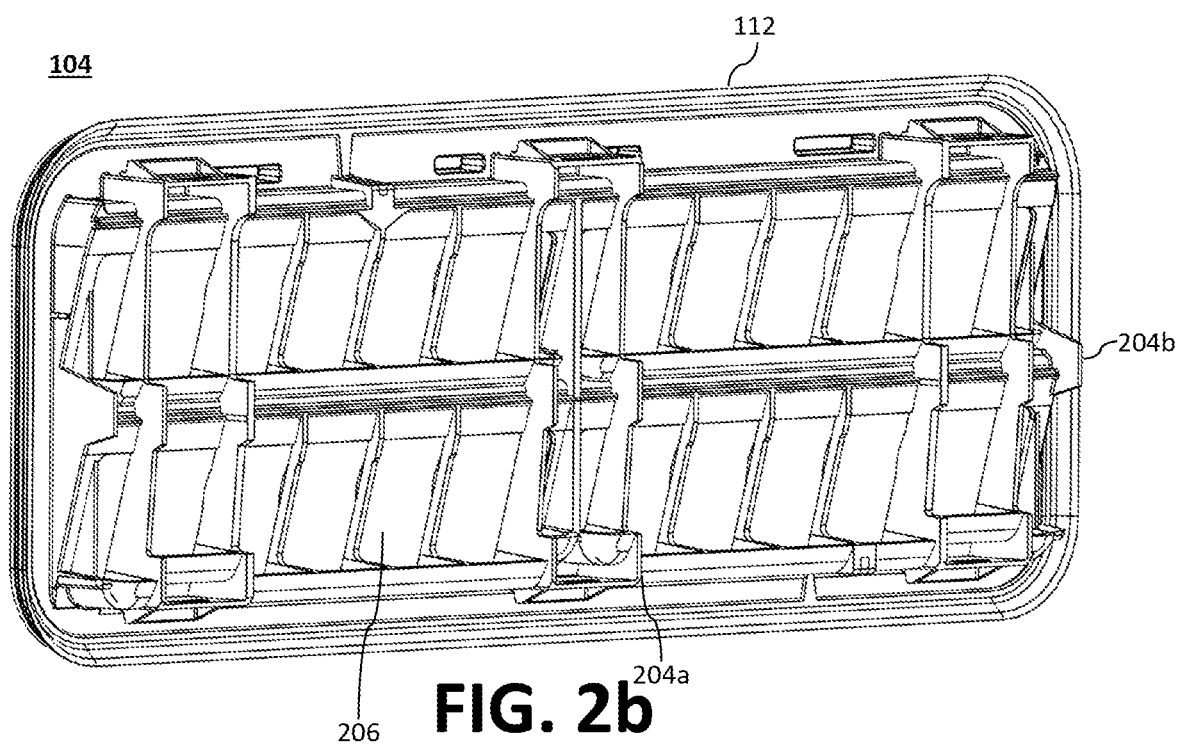
Figure 2C:
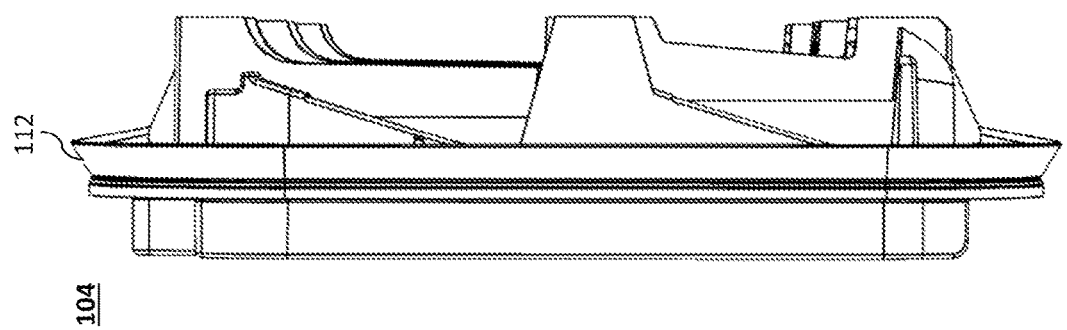
Figure 2D:
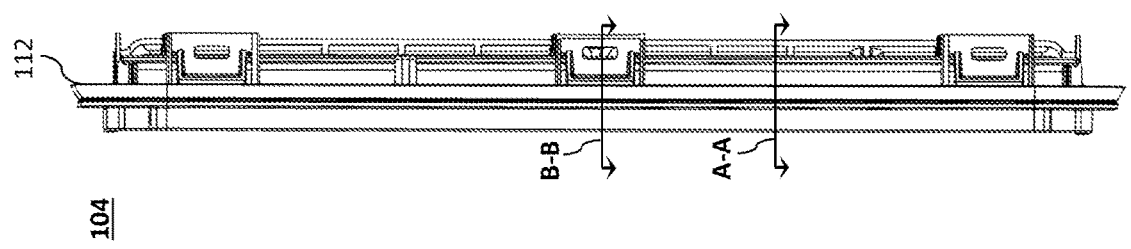
Figure 2E:
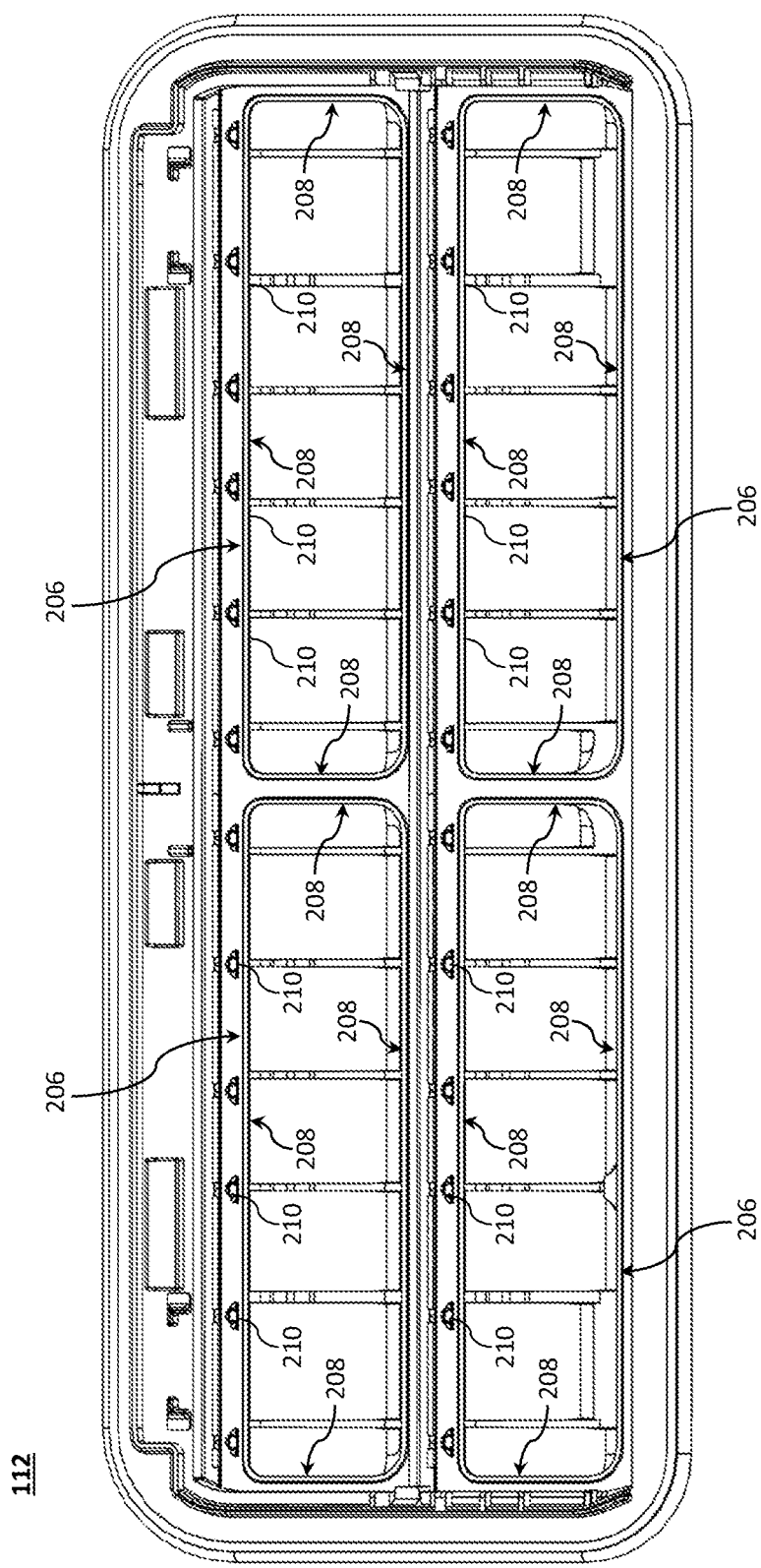

FIGS. 2c, 2d, and 2e illustrate, respectively, side elevation, top plan, and front elevational views of the example pressure vent valve.

Figure 3B:
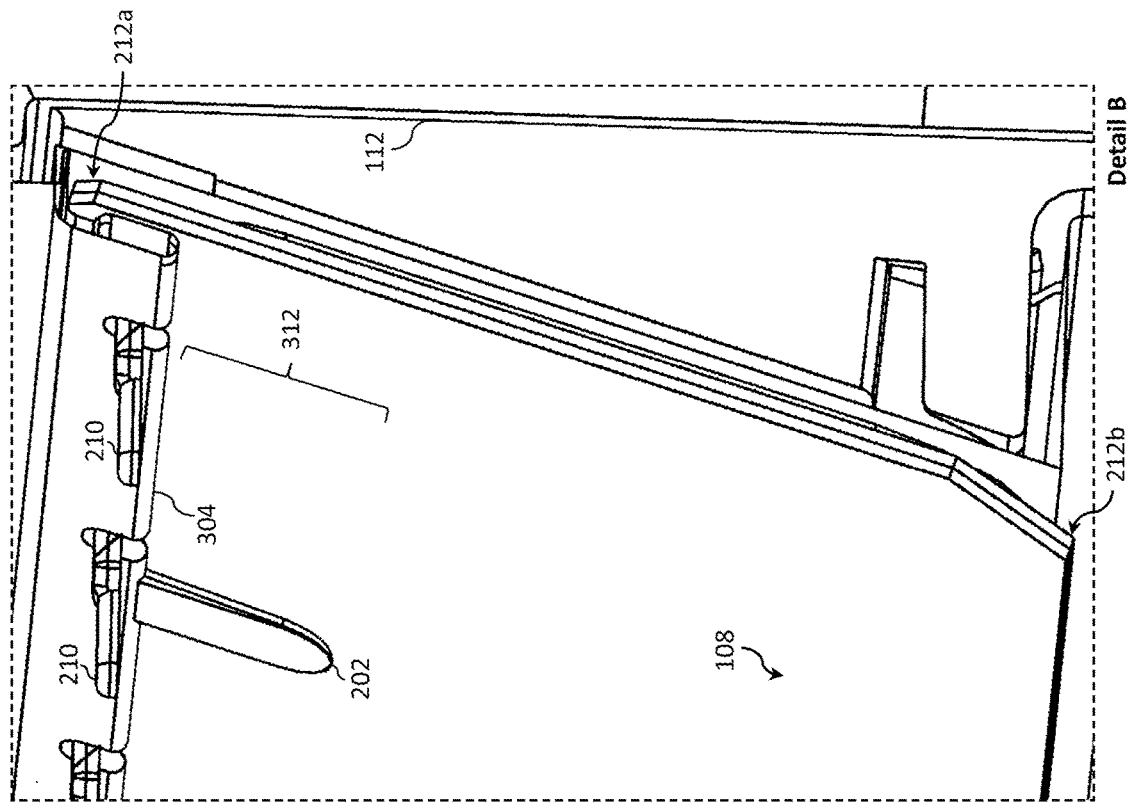
Figure 3B:
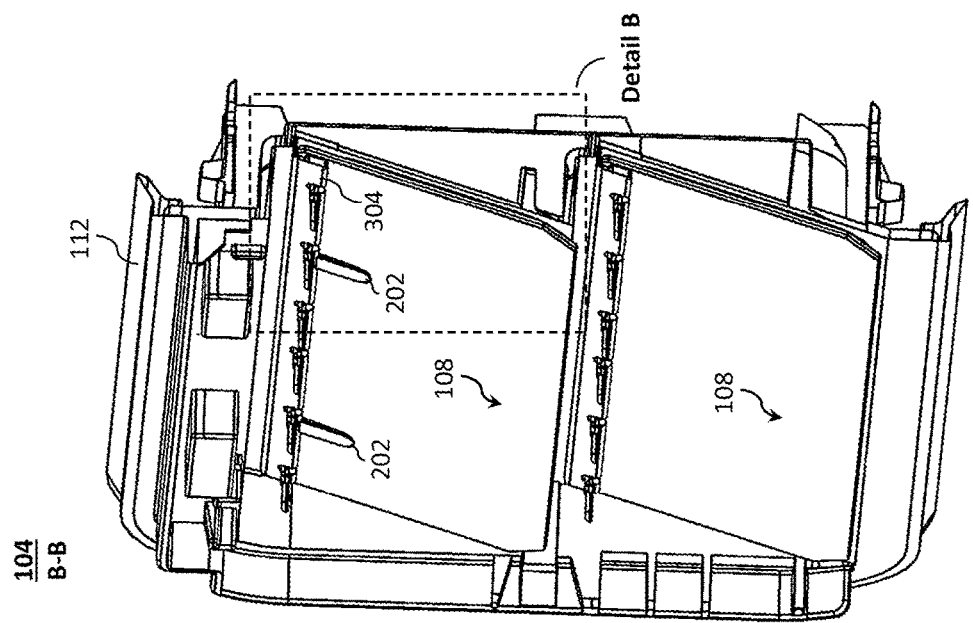

FIGS. 3a and 3b illustrate cross-sectional views of the example pressure vent valve taken along cutlines A-A and B-B, respectively.

Figure 4A:
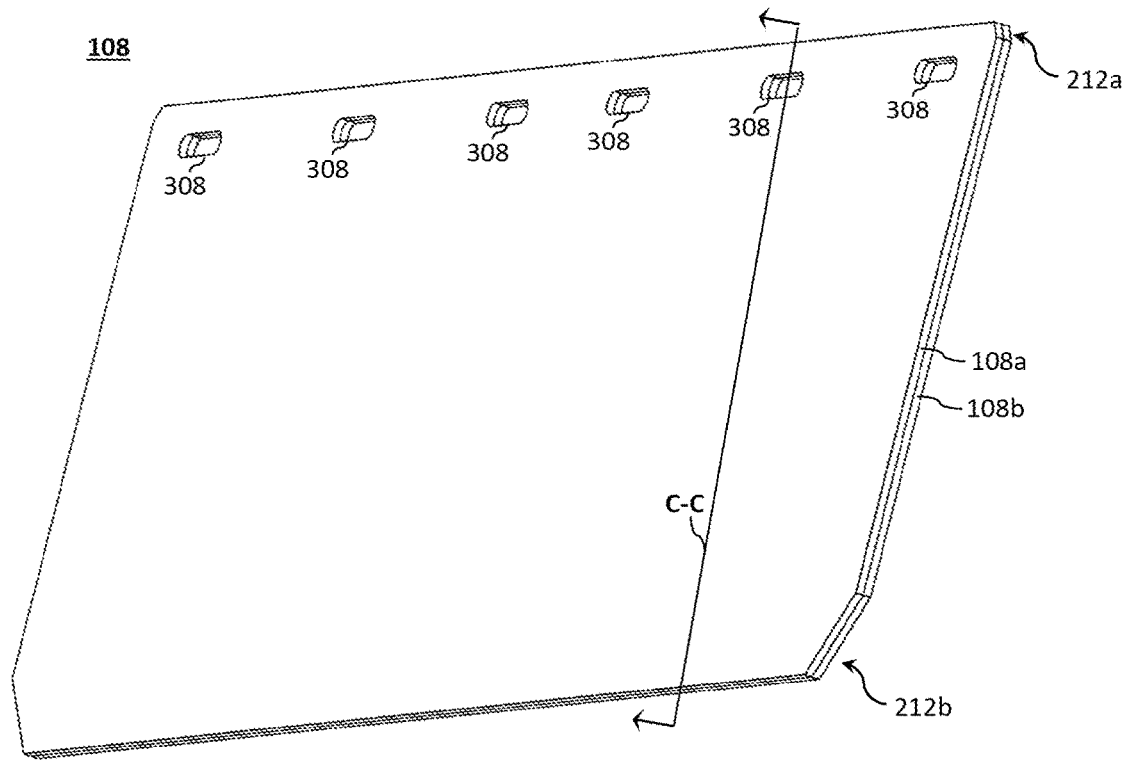

FIG. 4a illustrates a perspective view of an example valve flap assembly in an assembled state.

Figure 4B:
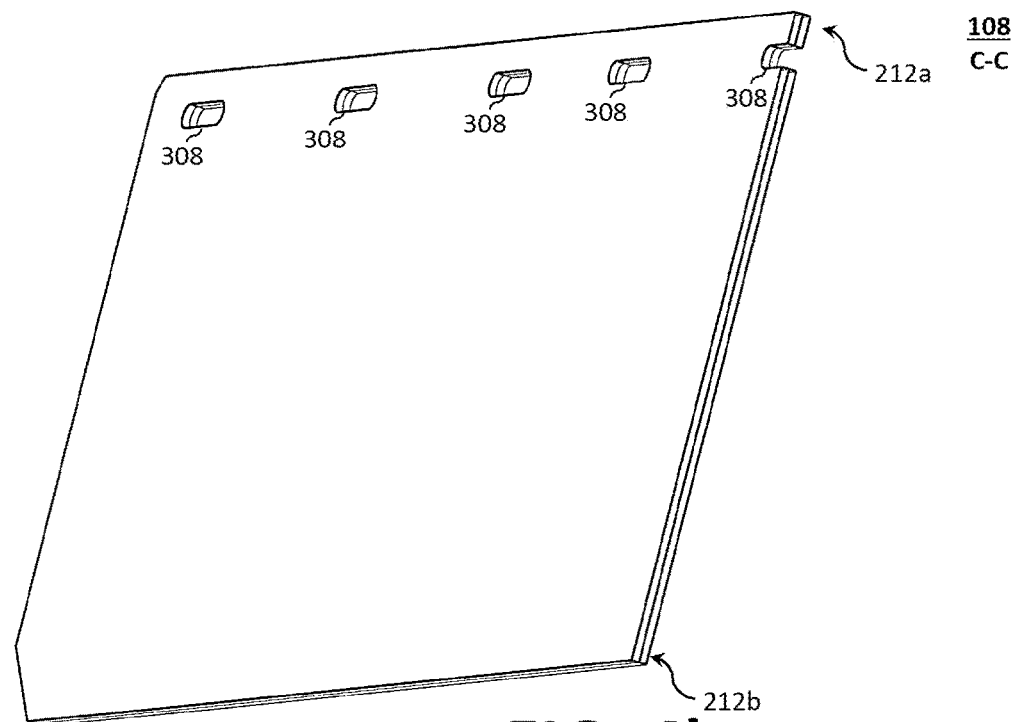

FIG. 4b illustrates a cross-sectional view of the valve flap assembly taken along cutline C-C.

Figure 4C:
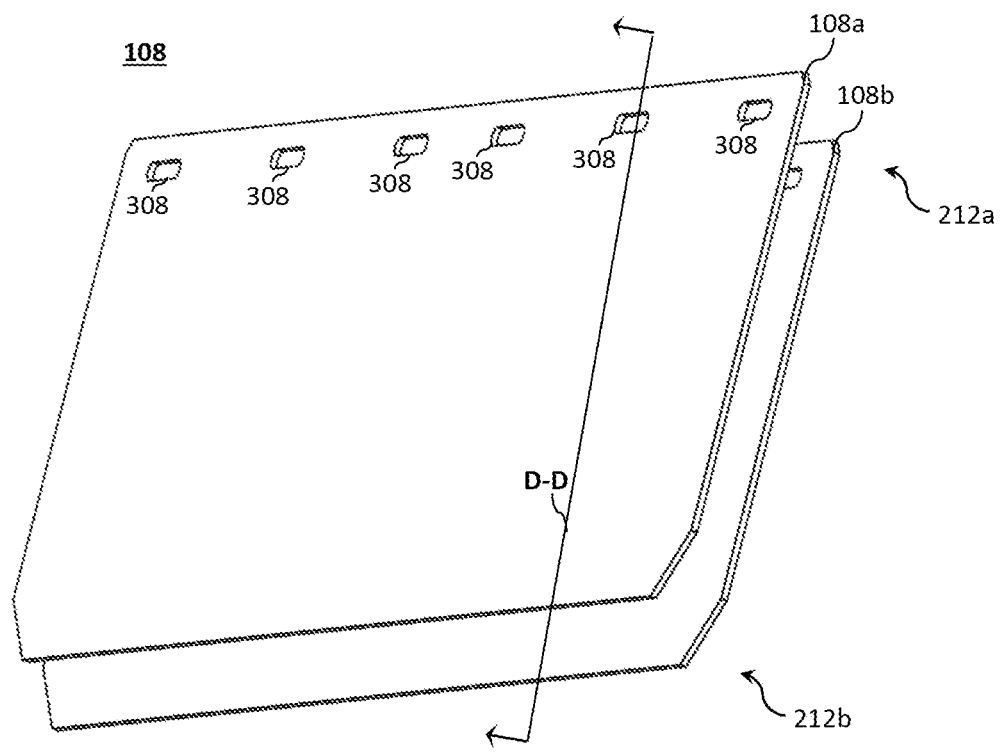

FIG. 4c illustrates a perspective view of an example valve flap assembly in a disassembled state.

Figure 4D:
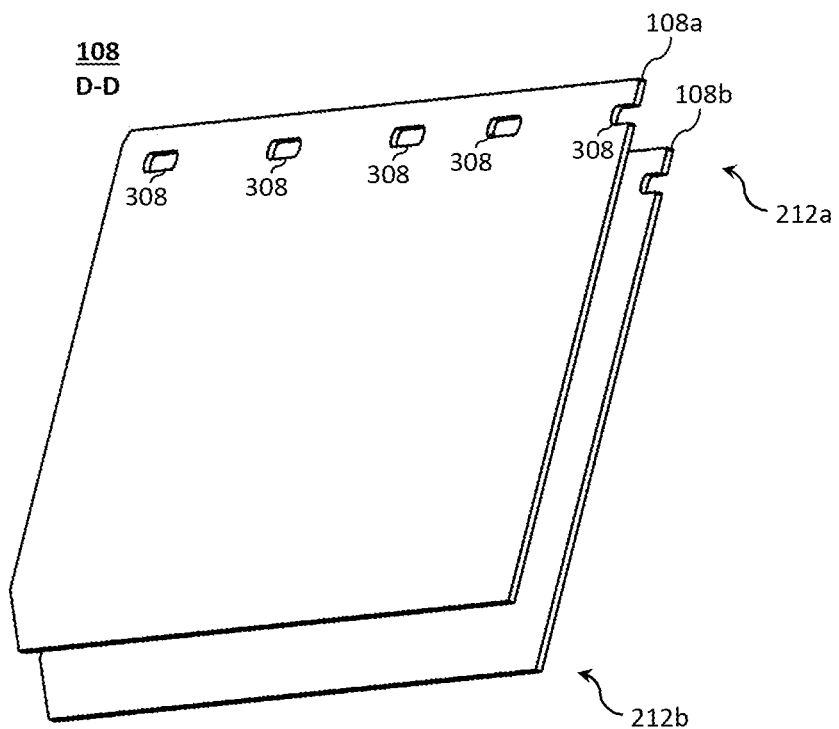

FIG. 4d illustrates a cross-sectional view of the valve flap assembly taken along cutline D-D.

FIG. 5a illustrates a perspective view of an example valve flap assembly in accordance with another aspect of the subject disclosure.

FIG. 5b illustrates a front elevational view of the example valve flap assembly of FIG. 5a in an assembled state.

FIG. 5c illustrates a side elevational view of the example valve flap assembly of FIG. 5a in the assembled state.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," "upper," "lower," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Disclosed is a return air blocking device with flap assemblies that mitigate the effects of flap warping or damage. In one example, a pressure vent valve for ventilation of an interior of a vehicle comprises a frame defining a vent opening, at least one sealing surface, and a plurality of fastening projections, wherein the at least one sealing surface and the plurality of fastening projections are positioned adjacent the vent opening; and a valve flap assembly mounted on the frame at a bearing surface via the plurality of fastening projections. The valve flap assembly comprises a first flap sheet stacked upon a second flap sheet. In an idle position, the valve flap assembly abuts the sealing surface and is configured to block a flow of air through the vent opening. When a pressure increases in the interior of a vehicle, the valve flap assembly assumes an open position where the valve flap assembly is lifted from the sealing surface to allow the flow of air through the vent opening.

In another example, a pressure vent valve for ventilation of an interior of a vehicle comprises a frame defining a plurality of vent openings and a plurality of valve flap assemblies mounted on the frame. Each of the plurality of vent openings comprises a sealing surface positioned adjacent the vent opening. Each of the plurality of valve flap assemblies comprising a first flap sheet stacked upon a second flap sheet. At least one of the plurality of valve flap assemblies is coupled to the frame at each of the plurality of vent openings and configured to alternate between an idle position and an open position. In the idle position, the valve flap assembly is configured to block a flow of air through the vent opening. In the open position, the valve flap assembly is lifted from the sealing surface to allow the flow of air through the vent opening.

In some examples, the valve flap assembly has a thickness between about 0.75 mm and 1.25 mm or about 1.0 mm. In some examples, the pressure vent valve further comprises a second valve flap assembly mounted on the frame and configure to block a flow of air through a second vent opening formed in the frame. In some examples, the frame is fabricated from a rigid material and the valve flap assembly is fabricated from a flexible material. In some examples, the flexible material is a closed pore, foamed material. In some examples, the flexible material is a plastic material or a rubber material. In some examples, the frame further defines a stop surface and the valve flap assembly is secured to the frame such that the valve flap assembly assumes the open position by bending at a location that is spaced from the plurality of fastening projections. In some examples, the stop surface extends over a portion of the valve flap assembly such that, upon assuming the open position, the portion covered by the stop surface is undeflected. In some examples, the valve flap assembly bends in a curved manner when in the open position.

Figure 1A:
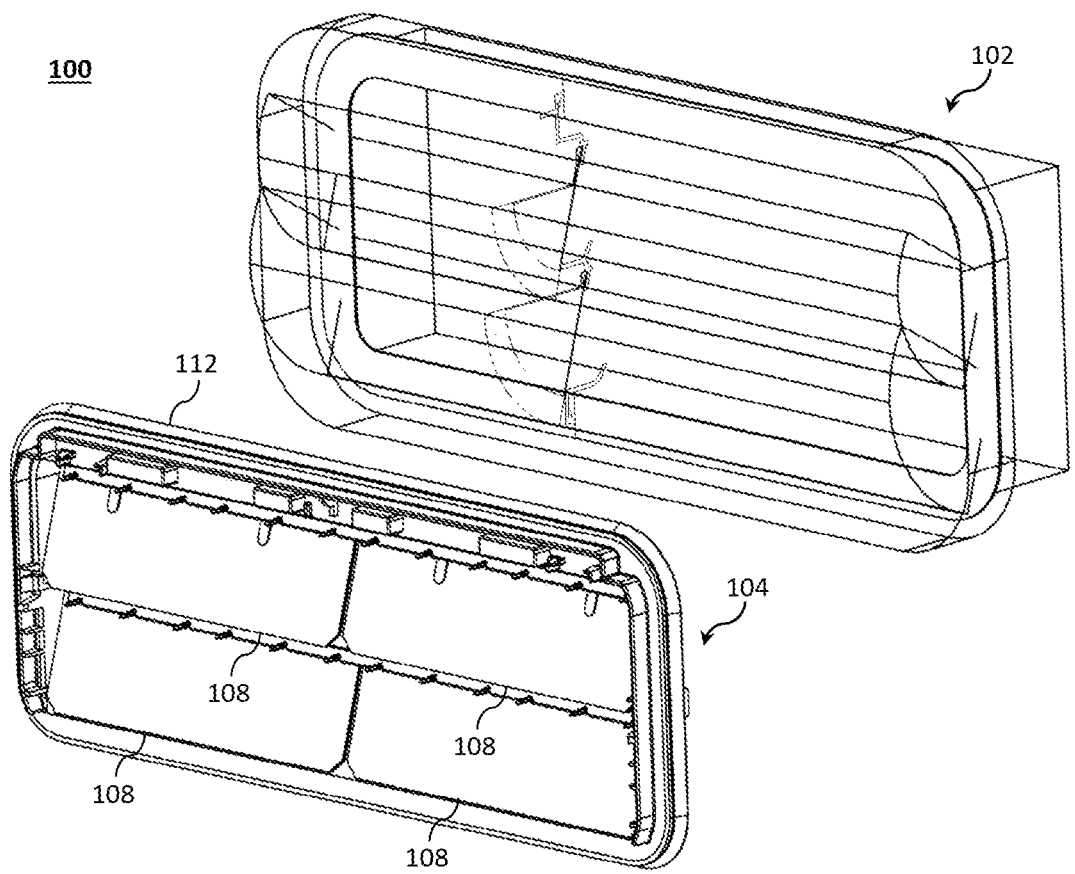
FIGS. 1a and 1b illustrate, respectively, assembly and assembled views of an example return air blocking system in accordance with an aspect of the subject disclosure.
Figure 1B:
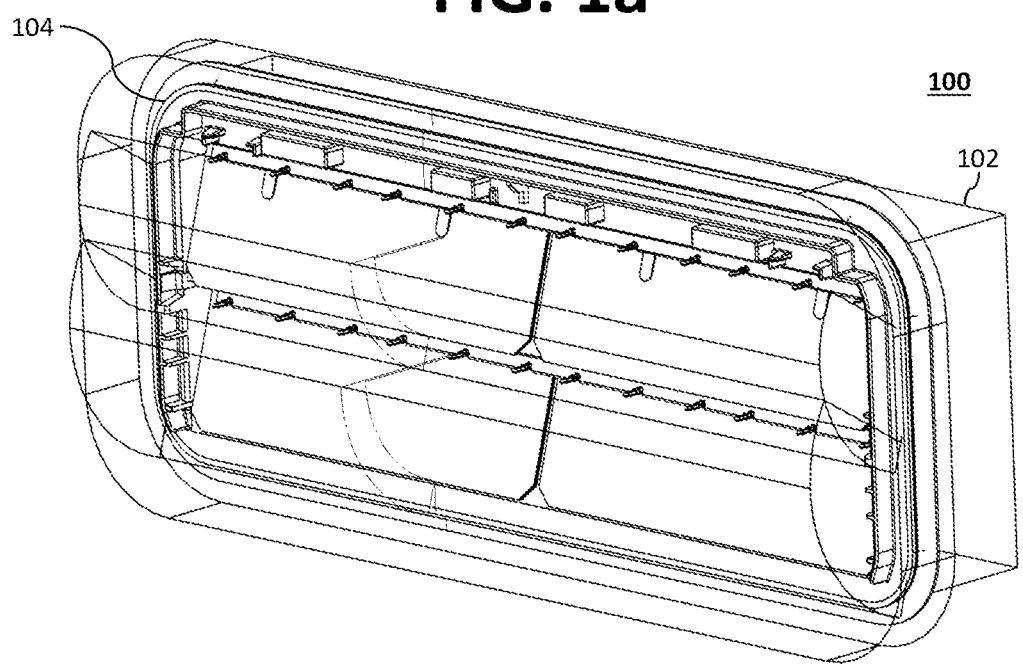

FIGS. 1a and 1b illustrate, respectively, assembly and assembled isometric views of an example return air blocking system 100 in accordance with an aspect of this disclosure. The illustrated return air blocking system 100 generally comprises a bracket 102 and a pressure vent valve 104. The bracket 102 is configured to retain and secure the pressure vent valve 104 relative to a vehicle. The return air blocking system 100 is positioned between an interior of a vehicle and the exterior environment of the vehicle and used for ventilation of the interior. The bracket 102 maybe attached to, or integral with, the vehicle. The vehicle may be, for example, a motor vehicle. In operation, the pressure vent valve 104 (e.g., via the frame 106) is inserted in an opening provided therefor in the body of the vehicle. The pressure vent valve 104 is inserted such that the back of the pressure vent valve 104 faces the interior of the vehicle, and the front of the pressure vent valve 104 is allocated to a region outside the vehicle interior.

FIGS. 2a through 2d illustrate, respectively, front perspective, rear perspective, side elevation, and top plan views of the pressure vent valve 104. FIG. 2e illustrates a front elevational view of the frame 106 with the valve flap assemblies 108 omitted for illustrative purposes. The pressure vent valve 104 includes a frame 106 (or similar housing) that defines a generally rectangular form (though other shapes are contemplated). In the illustrated example, the frame 106 defines, inter alia, at least one vent opening 206, at least one sealing surface 208, and a plurality of fastening projections 210.

Depending on the application, the frame 106 may be fabricated from a rigid material, such as, for example, synthetic or semi-synthetic polymers (e.g., plastics, such as acrylonitrile butadiene styrene (ABS) and polyvinyl chloride (PVC), etc.), composite materials (e.g., fiber glass), metal (or a metal alloy), or a combination thereof. In the illustrated example, the frame 106 can be fabricated using a relatively hard plastic via a plastic injection molding process. Therefore, in some examples, the frame 106 and its various features can be formed as a unitary structure.

As best illustrated in FIG. 2e, the frame 106 can be divided vertically by one or more longitudinal webs 204a and/or horizontally by one or more lateral webs 204b to define the one or more vent openings 206. In the illustrated example, the four vent openings 206 are arrange in a quad arrangement. Other arrangements, however, are contemplated (e.g., in a row, triangular, etc.). In particular, the illustrated frame 106 provides a longitudinal web 204a and a lateral web 204b to define forms four vent openings 206. The vent openings 206 are illustrated as generally rectangular openings, though other shapes are contemplated (e.g., square, trapezoidal, etc.).

The frame 106 includes at least one sealing surface 208 and at least one flexible valve flap assembly 108 mounted on the frame 106. Each of the plurality of valve flap assemblies 108 is coupled to the frame 106 at or adjacent each of the plurality of vent openings 206. As illustrated, a valve flap assembly 108 is arranged adjacent each of the four vent openings 206 and configured to cover each respective one of the four vent openings 206 when in the idle position. Each of the valve flap assemblies 108 is configured to alternate between the idle position and an open position.

The frame 106 is formed with sealing surfaces 208 such that the valve flap assemblies 108, when in the idle position, substantially and/or completely prevent the flow of air through the vent openings 206 of the frame 106. Therefore, the sealing surfaces 208 are generally located at the contact regions between the valve flap assembly 108 and frame 106. The sealing surfaces 208 for the valve flap assemblies 108 can be fabricated using a softer plastic material. For example, the sealing surfaces 208 can be molded onto the frame 106 in a multi-component injection molding process. In the illustrated example, the one or more sealing surfaces 208 are provided at the perimeter of each of the vent openings 206. The sealing surface 208 around each vent opening 206 may be continuous or segmented. Therefore, in some examples, the sealing surface 208 generally surrounds the vent openings 206 (or at least a bottom edge) and contacts the valve flap assembly 108.

The valve flap assemblies 108 are fabricated using a material that is flexible and/or softer relative to the material of the frame 106. In some examples, the flexible valve flap assembly 108 is made of a flexible material, such as closed pore, foamed material. It is also conceivable that the valve flap assemblies 108 could comprise other plastic and/or rubber flexible materials. In any case, the valve flap assemblies 108 are generally thin and hence very flexible to allow them to alternate between the idle position and the open position.

FIGS. 3a and 3b, which are cross-sectional views taken along cutlines A-A (FIG. 2d) and B-B (FIG. 2d), illustrate the valve flap assemblies 108 in the idle position. The valve flap assemblies 108 are mounted at one end (e.g., along one edge) on the frame 106 via, inter alia, one or more fastening projections 210 formed on the frame 106. In the illustrated example, a plurality of fastening projections 210 are arranged and aligned in a row along an upper edge of each of the vent openings 206.

As best illustrated in FIG. 3a, an attachment edge 212a of each valve flap assembly 108 is coupled to the frame 106 at a bearing surface 302 via a bracket 304. The attachment edge 212a of the valve flap assembly 108 is, in effect, sandwiched between the bearing surface 302 and an inner surface of the bracket 304. To prohibit the attachment edge 212a of the valve flap assembly 108 from sliding out of the bracket 304, the plurality of fastening projections 210 can pass through the valve flap assembly 108 and into the bracket 304.

As illustrated, the valve flap assemblies 108 each have a plurality of flap openings 308 formed along the attachment edge 212a through which the fastening projections 210 of the frame 106 are passed to secure the valve flap assembly 108 to the frame 106. The valve flap assemblies 108 are mounted by passing the fastening projections 210 through the flap openings 308. The fastening projections 210 may be tapered and sized such that a tip of the fastening projection 210 is smaller than the flap opening 308, while a base end of the fastening projection 210 is larger than the flap openings 308. As a result, when installed, the flap opening 308 can stretch and/or deform to better contact and secure to the fastening projections 210 at the base end.

The various figures illustrate the valve flap assembly 108 in the idle position (e.g., closed). In the idle position, a free edge 212b of the valve flap assembly 108 abuts the sealing surface 208 and is configured to block a flow of air through the vent opening 206. When a pressure increases in the interior of a vehicle, the valve flap assembly 108 assumes the open position such that the free edge 212b of the valve flap assembly 108 is lifted from the sealing surface 208 to allow a flow of air through the vent opening 206.

When the air pressure increases within the cabin, for example, the valve flap assemblies 108 assume a vent position whereby the free edges 212b of the valve flap assemblies 108 flex upward as indicated by arrow 310 to allow air flow through the vent opening 206 of the frame 106. In other words, when a sufficient pressure occurs, assumes an open position lifted from the sealing surface 208 in which it allows a flow of air through the pressure vent valve 104. Once the pressure between the vehicle interior and the environment has balanced, the valve flap assemblies 108 close automatically under their own weight (i.e., they return to the idle position).

The pressure vent valve 104 may further comprise one or more stop surfaces 202 (illustrated as tabs), which may be part of the frame 106 and/or bracket 304. In one example, the valve flap assembly 108 can be secured to the frame 106 such that the valve flap assembly 108 assumes the open position by bending at a location that is spaced from the plurality of fastening projections 210. As a result, wear and tear of the valve flap assembly 108 at the flap openings 308 is mitigated by shifting the bending/flexing moments away from the attachment point (i.e., flap openings 308). In the illustrated examples, the stop surface 202 extend over a portion 312 of the valve flap assembly 108 such that, upon assuming the open position, the portion 312 covered by the stop surface 202 is undeflected (e.g., generally flat). As a result, the valve flap assembly 108 can bend in a generally curved manner when in the open position.

FIG. 4a illustrates a perspective view of an example valve flap assembly 108 in an assembled state, while FIG. 4b illustrates a cross-sectional view of the valve flap assembly 108 taken along cutline C-C. As illustrated, the valve flap assembly 108 is a multi-layer assemble that comprises multiple layers. For example, as illustrated, the valve flap assembly 108 comprises a first flap sheet 108a stacked (or layered) upon a second flap sheet 108b. The first flap sheet 108a and the second flap sheet 108b and generally identical to one another and individually joined to the frame 106 via the fastening projections 210 and the plurality of flap openings 308 formed along the attachment edge 212a of the valve flap assembly 108. The first flap sheet 108a and the second flap sheet 108b may be formed using, for example, a stamping process.

FIG. 4c illustrates a perspective view of an example valve flap assembly 108 in a disassembled state, while FIG. 4d illustrates a cross-sectional view of the valve flap assembly 108 taken along cutline D-D. As illustrated, the first flap sheet 108a and the second flap sheet 108b are separate from one another. That is, they are not glued or otherwise adhered to one another to form a unitary structure—as would be the case with a laminated structure. As a result, if one of the first flap sheet 108a or the second flap sheet 108b becomes damaged and/or curls away from the sealing surface 208, the other one of the first flap sheet 108a or the second flap sheet 108b would remain to seal the vent openings 206. In effect, providing both the first flap sheet 108a and the second flap sheet 108b allows one to serve as a sacrificial layer—typically the outermost sheet (illustrated as the first flap sheet 108a).

In some examples, the valve flap assembly 108 has a thickness between about 0.75 mm and 1.25 mm, or about 1.0 mm. The first flap sheet 108a and the second flap sheet 108b of a given valve flap assembly 108 may be identical to one another in terms of material, shape, and dimensions. Therefore, each of the first flap sheet 108a and the second flap sheet 108b can have a thickness between about 0.375 mm and 0.75 mm, or about 0.5 mm. In some examples, 3 or more flap sheets may be used; however, attention must be paid to the overall thickness and/or rigidity of the valve flap assembly 108 to ensure that the valve flap assembly 108 remains sufficiency flexible to deflect into the open position during operation.

FIG. 5a illustrates a perspective view of an example valve flap assembly 108 in accordance with another aspect of the subject disclosure. As illustrated, the valve flap assembly 108 is in a disassembled state. FIGS. 5b and 5c illustrate, respectively, a front elevational view and a side elevational view of the valve flap assembly 108 in an assembled state. While the above-described examples illustrate and describe where the first flap sheet 108a and the second flap sheet 108b of a given valve flap assembly 108 are identical to one another in terms of material, shape, and dimensions, the first flap sheet 108a and the second flap sheet 108b may instead be different in terms of material, shape, and dimensions.

In the illustrated example, the first flap sheet 108a is larger than the second flap sheet 108b. Specifically, the first flap sheet 108a is illustrated as having a first width ($W_1$) and a first height ($H_1$), while the second flap sheet 108b is illustrated as having a second width ($W_2$) and a second height ($H_2$). The first width ($W_1$) is greater than the second width ($W_2$) and the first height ($H_1$) is greater than the second height ($H_2$). As a result, as best illustrated in FIG. 5b, the first flap sheet 108a defines an overhang on each side of the flap assembly 108 having a first distance ($D_1$). The first distance ($D_1$) being the first width ($W_1$) minus the second width ($W_2$)

and then divided by two. Similarly, as best illustrated in FIG. 5c, the first flap sheet 108a defines an overhang on the free edge 212b having a second distance ($D_2$). The second distance ($D_2$) being the first width ($W_1$) minus the second width ($W_2$). In some examples, the first distance ($D_1$) is substantially equal to the second distance ($D_2$). Notably, the first flap sheet 108a and the second flap sheet 108b are aligned at the attachment edge 212a (i.e., there is no overlap distance) to enable the attachment edge 212a of the valve flap assembly 108 to remain sandwiched between the bearing surface 302 and an inner surface of the bracket 304. Likewise, the flap openings 308 formed along the attachment edge 212a of each of the first flap sheet 108a and the second flap sheet 108b align to permit attachment to the fastening projections 210.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A pressure vent valve for ventilation of an interior of a vehicle, the pressure vent valve comprising:
   a frame defining a vent opening, at least one sealing surface, and a plurality of fastening projections, wherein the at least one sealing surface and the plurality of fastening projections are positioned adjacent the vent opening; and
   a valve flap assembly mounted on the frame at a bearing surface via the plurality of fastening projections,
   wherein the valve flap assembly comprises a first flap sheet stacked upon a second flap sheet,
   wherein, in an idle position, the valve flap assembly abuts the sealing surface and is configured to block a flow of air through the vent opening, and
   wherein, when a pressure increases in the interior of the vehicle, the valve flap assembly assumes an open position where the valve flap assembly is lifted from the sealing surface to allow the flow of air through the vent opening.

2. The pressure vent valve of claim 1, wherein the valve flap assembly has a thickness between about 0.75 mm and 1.25 mm.

3. The pressure vent valve of claim 2, wherein the valve flap assembly has a thickness of about 1.0 mm.

4. The pressure vent valve of claim 2, wherein each of the first flap sheet and the second flap sheet has a thickness of about 0.5 mm.

5. The pressure vent valve of claim 1, further comprising a second valve flap assembly mounted on the frame and configure to block a flow of air through a second vent opening formed in the frame.

6. The pressure vent valve of claim 1, wherein the frame is fabricated from a rigid material and the valve flap assembly is fabricated from a flexible material.

7. The pressure vent valve of claim 6, wherein the flexible material is a closed pore, foamed material.

8. The pressure vent valve of claim 6, wherein the flexible material is a plastic material or a rubber material.

9. The pressure vent valve of claim 1, wherein the frame further defines a stop surface and the valve flap assembly is secured to the frame such that the valve flap assembly assumes the open position by bending at a location that is spaced from the plurality of fastening projections.

10. The pressure vent valve of claim 9, wherein the stop surface extends over a portion of the valve flap assembly such that, upon assuming the open position, the portion covered by the stop surface is undeflected.

11. The pressure vent valve of claim 1, wherein the valve flap assembly bends in a curved manner when in the open position.

12. A pressure vent valve for ventilation of an interior of a vehicle, the pressure vent valve comprising:
    a frame defining a plurality of vent openings,
    wherein a sealing surface is positioned adjacent each of the plurality of vent openings; and
    a plurality of valve flap assemblies mounted on the frame, each of the plurality of valve flap assemblies comprising a first flap sheet stacked upon a second flap sheet,
    wherein one of the plurality of valve flap assemblies is coupled to the frame at each of the plurality of vent openings and configured to alternate between an idle position and an open position,
    wherein, in the idle position, the one of the plurality of valve flap assemblies is configured to block a flow of air through one of the plurality of vent openings, and
    wherein, in the open position, the one of the plurality of valve flap assemblies is lifted from the sealing surface to allow the flow of air through the one of the plurality of vent openings.

13. The pressure vent valve of claim 12, wherein at least one of the plurality of valve flap assemblies has a thickness between about 0.75 mm and 1.25 mm.

14. The pressure vent valve of claim 13, wherein each of the first flap sheet and the second flap sheet has a thickness of between about 0.375 mm and 0.75 mm.

15. The pressure vent valve of claim 12, wherein the frame is fabricated from a rigid material and the plurality of valve flap assemblies is fabricated from a flexible material.

16. The pressure vent valve of claim 15, wherein the flexible material is a closed pore, foamed material.

17. The pressure vent valve of claim 15, wherein the flexible material is a plastic material or a rubber material.

18. The pressure vent valve of claim 12, wherein the frame further defines a stop surface and at least one of the plurality of valve flap assemblies is secured to the frame such that the at least one of the plurality of valve flap assemblies assumes the open position by bending at a location that is spaced from a plurality of fastening projections.

19. The pressure vent valve of claim 18, wherein the stop surface extends over a portion of the at least one of the plurality of valve flap assemblies such that, upon assuming the open position, the portion covered by the stop surface is undeflected.

20. The pressure vent valve of claim 19, wherein the plurality of valve flap assemblies bend in a curved manner when in the open position.

* * * * *